United States Patent [19]

Mosley, Jr. et al.

[11] 4,333,060
[45] Jun. 1, 1982

[54] PHASE LOCKED LOOP FOR RECOVERING DATA BIT TIMING

[75] Inventors: William H. Mosley, Jr., St. Petersburg; Carl F. Andren, Indiatlantic, both of Fla.

[73] Assignee: E-Systems, Inc., Dallas, Tex.

[21] Appl. No.: 167,545

[22] Filed: Jul. 10, 1980

[51] Int. Cl.³ ............................................. H03L 7/08
[52] U.S. Cl. .................................... 331/1 A; 331/17; 331/23; 331/27
[58] Field of Search ...................... 331/1 A, 17, 23, 25, 331/27; 329/50, 109, 122; 375/24, 94, 120

[56] References Cited

U.S. PATENT DOCUMENTS

| | | | |
|---|---|---|---|
| 3,691,474 | 9/1972 | Calaway | 331/1 A |
| 3,973,212 | 8/1976 | Walloch | 329/122 |
| 4,128,811 | 12/1978 | Englund, Jr. | 328/134 |
| 4,219,784 | 8/1980 | Detering | 331/27 |

*Primary Examiner*—Siegfried H. Grimm

*Attorney, Agent, or Firm*—Robert V. Wilder; Albert M. Crowder, Jr.

[57] ABSTRACT

Three sample and hold circuits (26, 30 and 34) sample a received pulse amplitude modulated signal at twice the data bit frequency or timing of the received signal. The clock to the sample and hold circuits is timed so that three consecutive samples, two mid-bit samples and a transition sample are held in the circuits (26, 30 and 34) once every two sample periods. The mid-bit samples are added together by an adder (32) and divided by two in a divider (38) to provide an average. The transition sample is subtracted from this average in a subtractor (36) to produce an error signal. The error signal is normalized in a multiplier (44) using the reciprocal of the difference in magnitude between the two mid-bit samples to produce a normalized signal. A clock signal is generated by a voltage controlled oscillator (52) in response to the normalized signal at twice the bit frequency or bit timing and in synchronism therewith.

28 Claims, 4 Drawing Figures

4,333,060

PHASE LOCKED LOOP FOR RECOVERING DATA BIT TIMING

TECHNICAL FIELD

The present invention relates to phase locked loops for recovering data bit timing and particularly relates to a phase locked loop for recovering data bit timing of a received pulse amplitude modulated signal.

BACKGROUND OF INVENTION

Phase locked loops are commonly used to recover data bit timing or frequency information from a noise corrupted signal in order to subsequently recover data from the signal. The recovery of data bit timing of a pulse amplitude modulated signal presents unique problems in that such signal contains both digital and analog characteristics that make utilization of standard digital techniques for clock recovery inadequate.

Pulse amplitude modulation is essentially a sampled-data type of encoding in which information is encoded into the amplitude of a train of pulses. The amplitudes of the pulses constitute the transmitted data. The pulse train itself may be considered the data carrier. Pulse amplitude modulation (PAM) is chiefly used for time division multiplex systems employing a number of channels. Usually, information is transmitted in frames of a plurality of pulses, and information is usually repeated once per frame. Each time slot or data pulse represents an analog voltage of data for a specific channel. Since each data channel is independent of each other data channel, the transition from one data pulse to the next is an indeterminate quantity. There may be a large amplitude variation between adjacent data pulses, or there may be no variation. The transitions between data bits or pulses do not necessarily ever cross zero except perhaps during the specific intervals normally used for frame synchronization, amplitude restoration and D. C. restoration.

The indeterminate nature of transitions in a PAM signal renders it difficult to use the transition between data bits to recover data bit timing. In one prior art device, a differentiator is used to detect the transitions from one bit to the next, and an absolute value circuit is used to make all transitions appear to be of the same polarity. The output of the absolute value circuit is a train of pulses having variable amplitudes that is used to generate an error voltage. The error voltage is used as the control signal in a phase locked loop to recover data bit timing.

The principal difficulty with this prior art device is implementation of the differentiator. Such differentiator must be designed to handle widely varying amplitudes of the received PAM signal. Often, the received PAM signal is filtered before data bit timing is recovered. Such filtering would soften (decrease the slope of) the transition leaving less energy for differentiation. Filtering, variable amplitudes of the data bits, and noise all combine to produce a jitter which degrades performance of this prior art device.

Another prior art device uses the frame synchronization pulses only to recover data bit timing. This technique is unsatisfactory for many applications because it is slow, requires very low loop bandwidths and has a very narrow acquisition range.

SUMMARY OF INVENTION

The present invention takes advantage of all of the available energy in each and every data bit transition for locking a phase locked loop. The PAM signal is sampled at twice the data bit timing or the PAM data rate. Sampling is timed such that samples will occur in the middle of each data bit and at each bit transition. Three successive samples, two mid-bit samples and a transition sample, are used to determine data bit timing. The average of the two mid-bit samples is compared with the transition sample. An error voltage is produced in accordance with any variation between the magnitude of the transition sample and the average of the two mid-bit samples. The error voltage is used in a phase locked loop to control an oscillator. The output of the oscillator corresponds to the data bit timing of the received PAM signal.

In accordance with an embodiment of the present invention, a phase locked loop for recovering data bit timing from a received signal includes a sampling circuit for sampling the received signal at a sample rate of twice the data bit frequency (data bit timing). The sampling circuit is operable to sample the received signal at the middle of each data bit to produce mid-bit samples and at the middle of each transition between data bits to produce transition samples. A control circuit is responsive to the output of the sampling means to produce a control signal proportional to the difference between the average of adjacent mid-bit samples and the transition sample taken between the adjacent mid-bit samples. An oscillator circuit is responsive to the control signal to produce an oscillator signal corresponding to the data bit timing of the received signal. The sampling circuit is operable to sample the received signal at a sample rate determined by the oscillator signal so that the sample rate and the oscillator signal frequency vary when the transition bit sample differs in magnitude from the average of the mid-bit samples.

In one embodiment, the sampling circuit comprises three cascade connected sample and hold circuits whose sample rate is responsive to the oscillator signal. The first sample and hold circuit has an input connected to receive the received signal. The second and third sample and hold circuits have inputs connected to the outputs of the first and second sample and hold circuits, respectively. Thus, mid-bit samples appear in the first and third sample and hold circuits and transition samples appear in the second sample and hold circuit once every two samples.

In accordance with a particular embodiment of the phase locked loop, a normalization circuit is provided to normalize the magnitude of the control signal. The normalization circuit may include a subtractor for subtracting the outputs of the third sample and hold circuit from the output of the first sample and hold circuit. A nonlinear circuit is connected to the output of the subtractor to produce a nonlinear signal inversely proportional to the difference between the outputs of the first and third sample and hold circuits. Thus, the nonlinear signal is inversely proportional to the difference in magnitude between adjacent mid-bit samples. The nonlinear signal is used to normalize the control signal.

As hereinafter described in greater detail, the present invention may be implemented utilizing either analog or digital circuitry. Furthermore, although the invention is designed primarily for use with pulse amplitude modulation, it is understood that the apparatus and technique of the present invention are suitable for use with other forms of modulation. The present invention is compatible with transversal correlation for the detection of the unique frame synchronization bit pattern. Also, the invention utilizes all of the energy of the bit transitions to recover bit timing.

BRIEF DESCRIPTION OF THE DRAWINGS

The present invention may best be understood by those of ordinary skill in the art by reference to the following Detailed Description when considered in conjunction with the accompanying Drawings in which.

DETAILED DESCRIPTION

Figure 1:
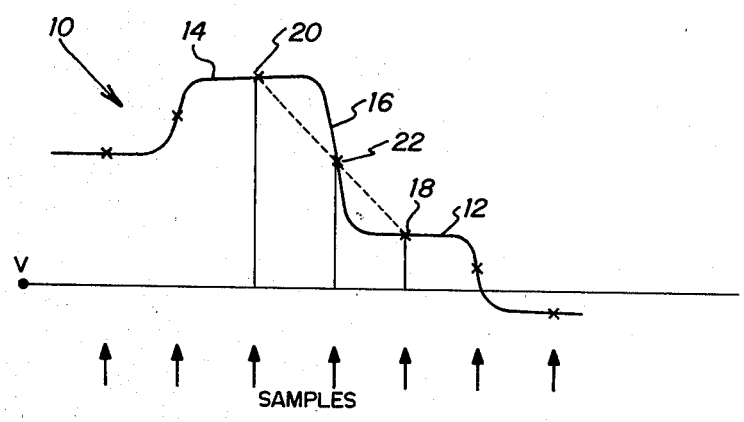
FIG. 1 is a graph of a pulse amplitude modulated signal showing the position of the samples utilized in the present invention.

Referring now to the drawings in which like reference characters designate like or corresponding parts throughout the several views, there is shown in FIG. 1 a diagram of the pulse amplitude modulated signal 10 that includes a first data bit 12, and a second data bit 14. A bit transition 16 occurs between data bits 12 and 14.

In the present invention, samples are taken of the pulse amplitude modulated signal 10 at a rate of twice the bit timing or bit frequency. Thus, samples are taken in the middle of each data bit and in the middle of each bit transition. Mid-bit samples 18 and 20 are taken in the middle of data bits 12 and 14, respectively. Transition sample 22 is taken in the middle of the transition 16 between data bits 12 and 14.

If the sampling rate is equal to twice the data bit timing and the sampling rate is phased in the desired synchronism with the data bit timing, the transition sample 22 will occur in the precise middle of the transition 16. Thus, the transition sample 22 will be equal in magnitude to the average of the magnitudes of the mid-bit samples 18 and 20.

In the present invention, data bit timing is determined by comparing the transition sample 22 to the average of the mid-bit samples 18 and 20. If the transition sample 22 is greater or smaller than the average of the mid-bit samples 18 and 20, the transition sample 22 is not occurring in the middle of the transition 16. In such case, the sampling rate has drifted out of phase with the bit timing of the signal 10, and the sampling rate is corrected accordingly in the manner hereinafter described.

The average of the mid-bit samples 20 and 18 is determined by adding one sample to the other and dividing by two. To correct for different polarities of transition, that is, positive going or negative going (positive or negative slopes), the difference between the mid-bit samples 18 and 20 is multiplied by ±1 which is developed from the sign of the difference between the samples 18 and 20.

Figure 2:
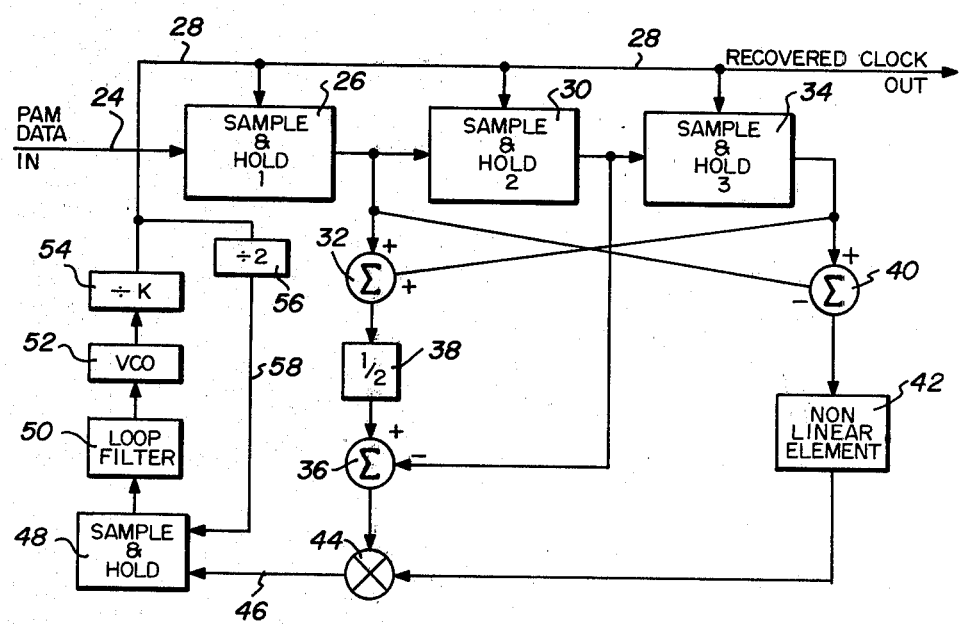
FIG. 2 is a circuit diagram of an analog embodiment of the present invention for recovering data bit timing.

Referring now to FIG. 2, there is shown an analog embodiment of the present invention. A received pulse amplitude modulated signal is applied on line 24 to a sample and hold 26. The sample and hold 26 receives a clock signal on line 28 and is clocked at twice the bit timing of the received signal.

The output of the sample and hold 26 is applied to a sample and hold 30 and to a summer 32. The output of the sample and hold 30 is applied to a third sample and hold 34 and to a subtractor 36. The sample and hold circuits 26, 30 and 34 are clocked at twice the data bit timing of the received signal by a clock signal received from line 28 and are cascade connected.

The sample and hold 26 will sample the received signal at mid-bit positions and at transition bit positions. Thus, once every two samples, the sample and hold 26 will contain a mid-bit sample. Each sample taken by the sample and hold 26 is transmitted to the sample and hold 30 and then to the sample and hold 34. Thus, the sample and hold circuits 26, 30 and 34 contain three consecutive samples of the received signal. Once every two samples, the sample and hold circuits 26 and 34 will contain mid-bit samples, and the sample and hold 30 will contain a transition bit sample.

The output of the sample and hold 34 and the output of the sample and hold 26 are applied to a summer 32 (an averaging circuit) that sums the magnitudes of the samples contained therein. The output of the summer 32 is applied to an amplitude divider 38 that produces a signal having a magnitude of one-half the output of the summer 32. Thus, the output of the amplitude divider 38 is equal to the average of the magnitudes of the mid-bit samples contained in the sample and hold circuits 26 and 34.

The output of the amplitude divider 38 is applied to one input of the subtractor 36 (a comparison circuit). The output of the sample and hold 30 is applied to the remaining input of the subtractor 36. Thus, the output of the subtractor 36 is equal to the difference between the average of the two mid-bit samples contained in the sample and hold circuits 26 and 34 and the transition sample contained in the sample and hold 30. The output of the subtractor 36 constitutes an error signal that is proportional in magnitude to the phase difference between the sampling rate of the sample and hold 26 and the data bit timing (frequency) of the received signal. As will be hereinafter described in greater detail, this error signal is used to recover the data bit timing.

The outputs of the sample and hold circuits 26 and 34 are also applied to a second subtractor 40. The output of the subtractor 40 is applied to a nonlinear element 42 whose output is applied to a multiplier 44. The other input of the multiplier 44 is connected to the output of the first subtractor 36 to receive the error signal. The output of the multiplier 44 on line 46 is a normalized control signal that is used in a phase locked loop to recover the data bit timing.

In one embodiment of the invention, the nonlinear element 42 produces a nonlinear signal that is inversely proportional to the output of the subtractor 40. The nonlinear signal corresponds to a limited reciprocal of the output of the subtractor 40. In this manner, the nonlinear signal from the nonlinear element 42 is inversely proportional to the difference in amplitude between adjacent mid-bit samples in the sample and hold circuits 26 and 34. The output of the nonlinear element 42 is limited to avoid circuit saturation when the difference between the mid-bit samples in the sample and hold circuits 26 and 34 approaches or is equal to 0. (The reciprocal of 0 is infinity.)

The nonlinear signal from element 42 serves two functions. First, the nonlinear signal functions to normalize the error signal produced by the subtractor 36, thereby producing a normalized control signal. Referring to FIGS. 1 and 2, it will be appreciated that the error signal of subtractor 36 will be directly proportional to the difference in magnitude between mid-bit samples 18 and 20. Thus, larger differences between the mid-bit samples 18 and 20 will cause larger error signals from the subtractor 36 even though the actual phase shift between the sampling rate and the data bit timing may be the same during both large and small data bit transitions. Since the error voltage from subtractor 36 will be directly proportional in magnitude to the magnitude difference between mid-bit samples 18 and 20, the error voltage may be normalized by multiplying it by the inverse (or reciprocal) of the magnitude difference between mid-bit samples 18 and 20. This multiplication is effected by multiplier 44 when the nonlinear signal from element 42 is multiplied by the error signal. However, as previously described, the nonlinear signal is limited so that the circuitry will not attempt to multiply by infinity (or divide by 0). In this manner, the control signal on line 46 is normalized to treat all bit transitions as approximately equal in importance in adjusting the sample frequency.

In some applications, it may be desired to allow the error signal to be directly proportional in magnitude to the difference in magnitude between adjacent mid-bit samples. In such case, the nonlinear element is designed to produce only a ±1 signal in accordance with the sign of the subtractor 40 output. The error signal from subtractor 36 is, thus, not normalized but the sign of the error signal is corrected as described below.

The second function of multiplier 44 is to insure that the sign, negative or positive, of the control signal on line 46 consistently indicates the direction, positive or negative, of phase drift regardless of whether the slope of the transition 16 is negative or positive and regardless of which mid-bit sample 18 or 20 is larger. For example, assume that sample 20 is greater than sample 18 and that the sampling rate is slightly behind the data bit timing. When the sampling rate is out of phase and behind the bit timing (phase), samples occur behind or after the occurrence of the middle of the bits or the middle of the bit transitions. In such case, transition sample 22 will be greater than the average of the two mid-bit samples 18 and 20. Thus, the error signal of subtractor 36 is negative. Since mid-bit sample 20 is greater than mid-bit sample 18, the output of the subtractor 40 and the nonlinear signal from element 42 will be positive. Thus, the multiplier 44 will multiply a negative signal times a positive signal to produce a negative normalized control signal on line 46.

As a second example, assume that mid-bit sample 20 is smaller than mid-bit sample 18 and, again, the sampling rate is slightly behind and out of phase with the data bit timing. In such case, transition sample 22 will be smaller than the average of the mid-bit samples 18 and 20. Thus, the error voltage of subtractor 36 will be positive. However, the output of the subtractor 40 and the nonlinear element 42 will be negative, and a negative nonlinear signal will be multiplied by a positive error signal in the multiplier 44 to produce a negative control signal on line 46. The above two examples demonstrate that regardless of which mid-bit sample 18 or 20 is greater, the control signal on line 46 will be negative whenever the sampling rate drops behind and out of phase with the data bit timing. Similarly, regardless of which mid-bit sample 18 or 20 is greater, the control signal on line 46 will be positive whenever the sampling rate is ahead and out of phase with the data bit timing.

The control signal on line 46 is applied to a sample and hold 48 whose output is applied to a loop filter 50. The output of the loop filter 50 is applied to control the frequency of a voltage controlled oscillator 52, and the output of the voltage controlled oscillator 52 is applied to a frequency divider 54 whose output is applied on line 28 to clock the sample and hold circuits 26, 30 and 34. Thus, the output of the frequency divider 54 constitutes the sampling rate. The control signal from line 46 will control the frequency of the voltage control oscillator 52 such that the clock signal on line 28, which is the sampling rate or frequency, is exactly twice the bit frequency of the received signal and is synchronized in phase therewith.

The clock signal on line 28 is applied to a second frequency divider 56 that divides the frequency of the clock signal by two. The output of the frequency divider 56 is applied on line 58 to clock the sample and hold 48, causing it to sample the control signal on line 46 at one-half the sampling rate of the sample and hold circuits 26, 30 and 34. The clock applied to the sample and hold 48 is chosen so that sampling of the control signal on line 46 occurs only when mid-bit samples appear in the sample and hold circuits 26 and 34 and a transition sample appears in the sample and hold 30. In this manner, the phase locked loop shown in FIG. 2 does not adjust the frequency of the VCO52 when two transition samples and one mid-bit sample appear in the sample and hold circuits 26, 30 and 34.

Figure 3:
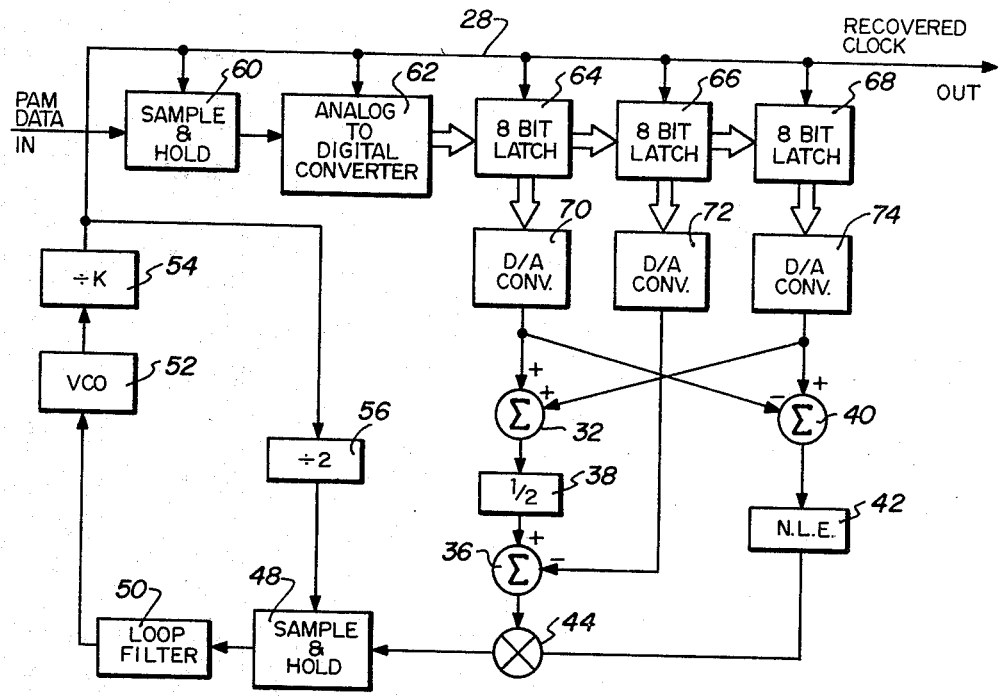
FIG. 3 shows a circuit diagram of an embodiment of the present invention in which a portion of the sampling circuitry is implemented digitally.

Referring now to FIG. 3, there is shown a circuit diagram of a partially digital embodiment of the invention. The circuitry shown in FIG. 3 is essentially the same as shown in FIG. 2 with the exception of the sampling circuitry. In FIG. 3, the pulse amplitude modulated signal is received by an analog sample and hold 60 whose output is applied to an analog to digital converter 62. The output of the converter 62 is applied to an eight bit latch 64. Eight bit latches 66 and 68 have inputs connected to the outputs of the latches 64 and 66, respectively. The sample and hold 60, the analog to digital converter 62, and the eight bit latches 64, 66 and 68 are all clocked simultaneously by the clock pulses occurring on line 28. The latches 64, 66 and 68 are functioning as a digital shift register that is eight bits wide and three bits long. Such digital shift register could be substituted for the latches 64, 66 and 68. It will also be appreciated that the latches 64, 66 and 68 are storing consecutive samples of the pulse amplitude modulated signal and are, thus, analogous in function to the sample and hold circuits 26, 30 and 34 shown in FIG. 2.

The output of the latches 64, 66 and 68 are applied to digital to analog converters 70, 72 and 74. The output of the converter 70 is applied to inputs of the summer 32 and the subtractor 40. The output of the converter 72 is applied to the subtractor 36, and the output of the converter 74 is applied to the summer 32 and to the subtractor 40. The remainder of the circuit shown in FIG. 3 functions in the same manner as the corresponding circuitry shown in FIG. 2.

Figure 4:
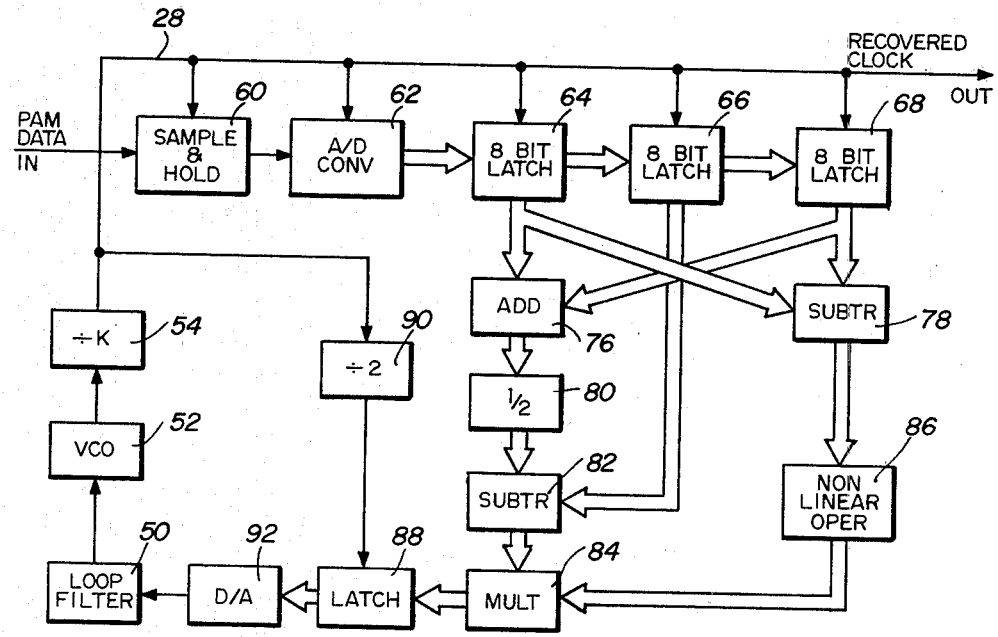
FIG. 4 is a circuit diagram of a primarily digital embodiment of the present invention.

Referring now to FIG. 4, there is shown a mostly digital embodiment of the invention. The sample and hold 60, the analog to digital converter 62, and the eight bit latches 64, 66 and 68 are substantially identical to the corresponding element shown in FIG. 3. The eight bit latches 64, 66 and 68 contain digital information corresponding to three consecutive examples of the received pulse amplitude modulated signal. The output of the eight bit latch 64 is applied to a digital adder 76 and a digital subtractor 78. The output of the adder 76 is input to the divider 80 which divides the magnitude of the number from the adder 76 by a factor of two.

A subtractor 82 receives inputs from the divider 80 and from the eight bit latch 66, and the output of the subtractor 82 is applied to a digital multiplier 84. The output of the eight bit latch 68 is applied to one input of the adder 76 and to an input of the subtractor 78. The other input of the subtractor 78 is supplied by the eight bit latch 64, and the output of the subtractor 76 is input to a digital nonlinear operator 86 whose output is connected to the remaining input of the multiplier 84. The output of the nonlinear operator 86 is inversely proportional to the output of the subtractor 78. For example, the output of nonlinear operator 86 may be the limited reciprocal of the output of subtractor 78. Alternately, the nonlinear operator may produce an output of ±1 in accordance with the sign of subtractor 78 output. It will be appreciated that operator 86 is the digital equivalent of the nonlinear element 42 of FIGS. 2 and 3. The output of the multiplier 84 is input to a control latch 88. The control latch 88 is clocked by a frequency divider 90 to sample the output of multiplier 84 at a rate equal to the bit timing frequency of the received pulse amplitude modulated signal. The output of the latch 88 is applied through a digital to analog converter 92 to the loop filter 50. The loop filter 50 is connected to the voltage controlled oscillator 52 which in turn is connected to a frequency divider 54. These latter analog elements function in the same manner as the corresponding elements shown in FIG. 2.

The circuitry shown in FIG. 4 is functionally similar to the circuitry shown in FIG. 2, except that analog components are utilized in the circuits shown in FIG. 2 and digital components are utilized in the circuit shown in FIG. 4. In function, the components of FIGS. 2 and 4 correspond as follows: digital adder 76 to summer 32, digital divider 80 to amplitude divider 38, digital subtractor 82 to analog subtractor 36, digital multiplier 84 to analog multiplier 44, digital subtractor 78 to analog subtractor 40, digital nonlinear operator 86 to analog nonlinear element 42, and digital control latch 88 to analog sample and hold 48. The digital to analog converter 92 simply converts the digital control signal to an analog control signal for application to the loop filter 50. Further digital embodiments of the present invention would have the loop filter and the voltage controlled oscillator as digital devices also.

It is also possible to use the sign of the transition slope as the normalization signal so that normalization is not taking place but a correction is being made to compensate for the possibility of negative and positive transition slopes.

With regard to the nonlinear element 42 and the nonlinear operator 86, it will be understood that these elements may provide a normalization function in a variety of different ways. For instance, these elements could produce an output equal to the reciprocal of its input, the limited reciprocal of its input, the sign of its input, etc. Although particular embodiments have been described, it is understood that the invention is capable of numerous rearrangements, modifications and substitutions of parts without departing from the spirit of the invention.

We claim:

1. A phase locked loop for recovering data bit frequency of a received signal including a plurality of data bits, comprising:

sampling means for sampling the received signal at a sample rate of twice the data bit frequency, said sampling means being operable to sample the received signal at the middle of each data bit to produce mid-bit samples and at the middle of each transition between data bits to produce transition samples;

control means responsive to the mid-bit samples and the transition samples of said sampling means for producing a control signal proportional to the difference between the average of adjacent mid-bit samples and the transition sample taken between the adjacent mid-bit samples;

oscillator means responsive to the control signal to produce an oscillator signal corresponding to the data bit frequency of the received signal; and said sampling means being operable to sample the received signal at a sample rate in response to the oscillator signal so that the sampling rate and the oscillator signal frequency will be varied whenever a difference exists between the transition bit sample and the average of the mid-bit samples adjacent to the transition bit sample.

2. The phase locked loop of claim 1 wherein said control means comprises:

a summer for adding the adjacent mid-bit samples;

a divide by two circuit connected to the summer to produce an average of the two adjacent mid-bit samples;

a subtractor for subtracting the transition bit sample from the average of the two adjacent mid-bit samples to produce an error signal; and said oscillator means being responsive to the error signal to produce the oscillator signal at a frequency of twice the data bit frequency and in phase synchronism therewith.

3. The phase locked loop of claim 1 wherein said oscillator means comprises:

a voltage controlled oscillator responsive to the control signal to produce a voltage controlled oscillator signal; and a division circuit connected to the output of said voltage controlled oscillator for producing the oscillator signal, the frequency of the oscillator signal being twice the frequency of the data bit timing.

4. The phase locked loop of claim 1 wherein said sampling means comprises first, second and third cascade connected sample and hold circuits whose sampling rate is controlled by the oscillator signal, said first sample and hold circuit having an input connected to receive the received signal, said second and third sample and hold circuits having inputs connected respectively to the outputs of said first and second sample and hold circuits, whereby said first and third sample and hold circuits contain mid-bit samples and said second sample and hold circuit contains a transition sample once every two sample periods.

5. The phase locked loop of claim 4 wherein said control means comprises:

a summer for adding the outputs of the first and third sample and hold circuits;

a divide by two circuit connected to the output of the summer for producing an average of the outputs of the first and third sample and hold circuits;

a first subtractor for subtracting the output of the second sample and hold circuit from the average of the outputs of the first and third sample and hold circuits; and said oscillator means being responsive to the output of the subtractor to produce the oscillator signal at a frequency of twice the data bit frequency of the received signal and in synchronism therewith.

6. The phase locked loop of claim 5 wherein said control means further comprises:

a fourth sample and hold circuit responsive to the output of said first subtractor and clocked at one-half the sampling rate of said first, second and third sample and hold circuits, said fourth sample and hold circuit being clocked to sample only when said first and third sample and hold circuits contain mid-bit samples and said second sample and hold circuit contains a transition sample; and said oscillator means being responsive to the output of said fourth sample and hold circuit to produce the oscillator signal at a frequency of twice the bit frequency.

7. The phase locked loop of claim 5 further comprising:

a second subtractor for subtracting the output of said third sample and hold circuit from the output of said first sample and hold circuit; and normalization means responsive to the outputs of said first and second subtractors for normalizing the output of said first subtractor so that the output of said normalization means is independent of the magnitude difference between adjacent mid-bit samples.

8. The phase locked loop of claim 5 further comprising:

a second subtractor for subtracting the output of said third sample and hold circuit from the output of said first sample and hold circuit;

a nonlinear element for producing a nonlinear signal inversely proportional in magnitude to the output of said second subtractor;

a multiplier for multiplying the outputs of the first subtractor and the nonlinear element to produce an error signal; and said oscillator being responsive to the error signal to produce the oscillator signal.

9. The phase locked loop of claim 8 further comprising a fourth sample and hold circuit connected to sample the error signal at a sample rate of one-half the sample rate of said first, second and third sample and hold circuits so that said fourth sample and hold circuit samples said error signal only when mid-bit samples are present in said first and third sample and hold circuits and a transition sample is present in said second sample and hold circuit.

10. The phase locked loop of claim 1 wherein said control means further comprises means for producing a normalized control signal so that the magnitude of said control signal is independent of the sign of the difference between adjacent mid-bit samples.

11. The phase locked loop of claim 10 wherein said normalization means is operable to adjust the magnitude of said control signal by a factor inversely proportional to the difference in magnitude between adjacent mid-bit samples.

12. A phase locked loop for recovering the data bit timing of a pulse amplitude modulated signal including a plurality of data bits, comprising:

sampling means including a plurality of outputs for sampling the pulse amplitude modulated signal to recover mid-bit samples and transition samples of the pulse amplitude modulated signal;

averaging means responsive to the outputs of said sampling means for producing an average signal corresponding to the average magnitude of adjacent mid-bit samples;

comparison means responsive to the average signal and to an output of said sampling means for producing an error signal corresponding to the difference between the average signal and the magnitude of the transition bit sample occurring between the two mid-bit samples;

normalization means responsive to outputs of said sampling means for producing a normalization signal that is inversely proportional in magnitude to the difference between the magnitudes of the two adjacent mid-bit samples;

multiplier means for multiplying the normalization signal and the error signal to produce a normalized control signal; and oscillator means responsive to the normalized control signal for producing an oscillator signal at a frequency of twice the data bit frequency and synchronized in phase therewith.

13. The phase locked loop of claim 12 wherein said sampling means comprises:

a sample and hold circuit for sampling the received signal;

an analog to digital converter for converting the output of the sample and hold circuit to a digital input;

first, second and third multiple bit latches clocked by the oscillator signal, said first latch being connected to receive the digital input, said second and third latches being connected to receive outputs from said first and second latches, respectively; and first, second and third digital to analog converters for converting the outputs of the first, second and third latches, respectively, into first, second and third analog sample signals, respectively.

14. A phase locked loop for recovering data bit timing of a received pulse amplitude modulated signal including a plurality of data bits occuring at a data bit frequency, comprising:

a sample and hold circuit for sampling the received signal at twice the data bit frequency for taking mid-bit samples and transition bit samples;

an analog to digital converter for converting the output of said sample and hold circuit to a digital input signal;

first, second and third multiple bit latches clocked at twice the data bit frequency, said first latch being connected to receive the digital input signal, said second and third latches being connected to receive outputs from said first and second latches, respectively;

a digital adder for adding the outputs of said first and third latches;

a digital divider for dividing the output of the digital adder by a predetermined factor;

a first digital subtractor for subtracting the output of said second latch from the output of said divider;

control means responsive to the output of said first digital subtractor to produce a control signal; and oscillator means responsive to the control signal for producing an oscillator means signal having a frequency of twice the data bit frequency, said oscillator signal being synchronized in frequency and phase with the data bit timing.

15. The phase locked loop of claim 14 wherein said control means further comprises a latch responsive to the output of said first digital subtractor and being clocked at one-half the data bit frequency so that the control signal is adjusted only when mid-bit samples are present in said first and third latches and transition bit samples are present in said second latch.

16. The phase locked loop of claim 14 further comprising:
a second digital subtractor for determining the difference between the outputs of said first and third latches;
a nonlinear operator responsive to the output of said second digital subtractor for producing a nonlinear signal that is inversely proportional to the difference between the outputs of said first and third latches;
said control means including a digital multiplier for multiplying the output of said first digital subtractor by the nonlinear signal to produce a normalized signal; and
said control means being operable to produce the control signal to response to the normalized signal.

17. The phase locked loop of claim 16 wherein said control means further comprises a fourth latch for receiving the output of said multiplier, said fourth latch being clocked at one-half the sampling frequency of said sample and hold circuit so that said fourth latch will sample the output of said multiplier only when mid-bit samples are present in said first and third latches and a transition sample is present in said second latch.

18. The phase locked loop of claim 17 wherein said oscillator means comprises:
a digital to analog converter for converting the output of said fourth latch into an analog control signal;
a loop filter connected to receive and filter the analog control signal;
a voltage controlled oscillator responsive to the output of said loop filter to produce a voltage controlled oscillator signal corresponding to the data bit timing of the received pulse amplitude modulated signal; and
a frequency divider connected to the output of the voltage controlled oscillator for producing the oscillator signal at twice the data bit frequency and in synchronization therewith.

19. A method for recovering the data bit timing of a received signal including a plurality of data bits, comprising the steps of:
sampling the received signal at a sample rate of twice the data bit frequency to provide mid-bit samples taken at the middle of each data bit and to provide transition samples taken at the middle of each transition between data bits;
producing a control signal proportional to the difference between the average of adjacent mid-bit samples and the transition sample taken between the adjacent mid-bit samples;
producing an oscillator means signal in response to the control signal, said oscillator means signal corresponding to the data bit frequency of the received signal; and
said sampling being responsive to the oscillator means signal to vary the sampling rate whenever a difference exists between the magnitudes of the transition bit sample and the average of the mid-bit samples adjacent to the transition bit sample.

20. The method of claim 19 wherein said step of producing a control signal comprises:
adding the adjacent mid-bit samples;
dividing the adjacent mid-bit samples by a factor of two of produce an average;
subtracting the transition bit sample from the average to produce an error signal; and
producing the control signal in response to the error signal.

21. The method of claim 19 wherein the step of producing the oscillator means signal comprises applying the control signal to a voltage controlled oscillator to produce a voltage controlled oscillator signal; and
applying the voltage controlled oscillator signal to a frequency division circuit to produce the oscillator means signal.

22. The method of claim 19 wherein said sampling step comprises sampling and holding first, second, and third consecutive samples of the received signal.

23. The method of claim 22 wherein said step of producing the control signal comprises:
adding the first and third consecutive samples of the received signal;
dividing the sum of the first and third samples by a factor of two to produce an average;
subtracting the second sample from the average to produce an error signal; and
producing the control signal in response to the error signal.

24. The method of claim 23 wherein the step of producing the control signal further comprises:
producing a normalized signal in response to the error signal;
sampling the normalized signal at one-half the sampling rate at which the first, second, and third samples are taken from the received signal; and
timing the sampling of the normalized signal so that samples are taken only when the first and third samples are mid-bit samples.

25. The method of claim 23 further comprising:
subtracting the third sample from the first sample to produce a difference signal;
producing a normalization signal that is inversely proportional to the difference signal; and
multiplying the normalization signal with the error signal to produce a normalized signal for use in producing the control signal.

26. The method of claim 19 further comprising the step of producing a normalized control signal so that the magnitude of said normalized control signal is independent of the magnitude difference between adjacent mid-bit samples.

27. The method of claim 19 further comprising:
producing a normalization signal that is inversely proportional to the difference in magnitude between adjacent mid-bit samples; and
producing a normalized control signal in response to the normalization signal so that the magnitude of the normalized control signal is independent of the magnitude difference between adjacent mid-bit samples.

28. A method for recovering the data bit timing of a pulse amplitude modulated signal including a plurality of data bits, comprising:

sampling the pulse amplitude modulated signal to recover mid-bit samples and transition samples thereof;

averaging adjacent mid-bit samples to produce an average signal;

comparing the average signal to the transition sample taken between the adjacent mid-bit samples to produce an error signal;

producing a normalization signal that is inversely proportional to the magnitude difference between the magnitudes of the two adjacent mid-bit samples;

multiplying the normalization signal and the error signal to produce a normalized control signal; and producing an oscillator means signal in response to the normalized control signal at a frequency of twice the data bit frequency and synchronized in phase therewith to recover the data bit timing.

* * * * *